United States Patent [19]

Knapp

[11] Patent Number: 4,754,783
[45] Date of Patent: Jul. 5, 1988

[54] SINGLE HANDLE MIXING VALVE WITH HYDRAULIC RESPONSIVE PISTON

[75] Inventor: Alfons Knapp, Biberach, Fed. Rep. of Germany

[73] Assignee: Masco Corporation, Taylor, Mich.

[21] Appl. No.: 804,260

[22] Filed: Dec. 3, 1985

[30] Foreign Application Priority Data

Dec. 11, 1984 [IT] Italy .................. 68231 A/84

[51] Int. Cl.⁴ .................................. F16K 11/06
[52] U.S. Cl. .................. 137/625.4; 251/172
[58] Field of Search .............. 137/625.4; 251/172

[56] References Cited

U.S. PATENT DOCUMENTS

| 3,556,151 | 1/1971 | Masuda | 251/172 X |
| 3,923,284 | 12/1975 | Stickler | 251/172 |
| 4,250,912 | 2/1981 | Knapp | 137/315 |
| 4,610,268 | 9/1986 | Knapp | 137/625.4 X |
| 4,676,270 | 6/1987 | Knapp et al. | 137/625.4 |

FOREIGN PATENT DOCUMENTS

| 52743 | 6/1982 | European Pat. Off. | 137/625.4 |
| 91703 | 10/1983 | European Pat. Off. | 137/625.4 |

Primary Examiner—Robert G. Nilson
Attorney, Agent, or Firm—Steven L. Permut; Malcolm L. Sutherland

[57] ABSTRACT

A mixing valve for a faucet includes a faucet body with a chamber that receives a cartridge and a bore that receives a piston. The piston has passageways therethrough in communication with inlets of the body and also in communication to entrances in the cartridge. The piston has a passage leading to a chamber that is interposed between the piston and the body that is responsive to hydraulic pressure from one of the inlets to create a bias that presses against the cartridge and transfers compressive force to a moving valve plate and a fixed valve plate that are within the cartridge. Furthermore, a supplemental spring is interposed within the hydraulic chamber to give mechanical upward bias of the piston against the cartridge.

17 Claims, 2 Drawing Sheets

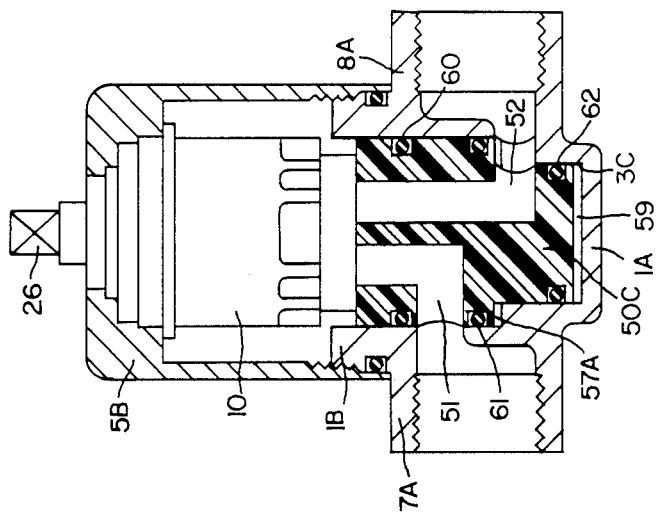
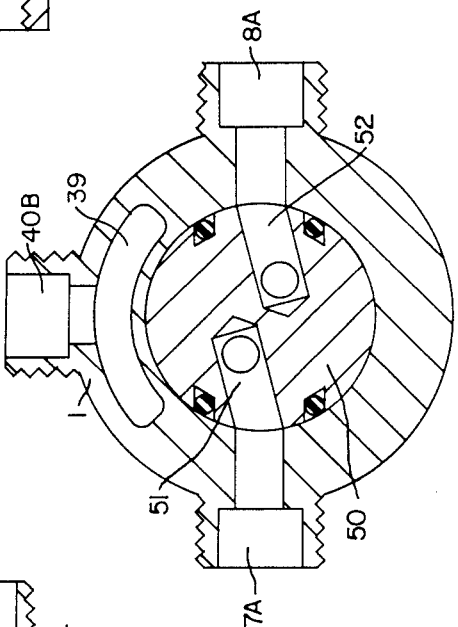
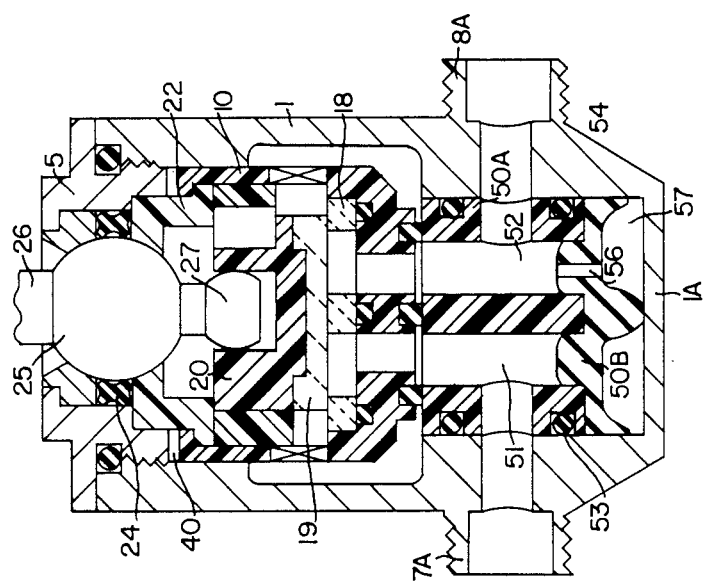

SINGLE HANDLE MIXING VALVE WITH HYDRAULIC RESPONSIVE PISTON

TECHNICAL FIELD

This invention relates to faucet valves and more particularly faucet valves that incorporate sliding ceramic plates.

BACKGROUND OF THE INVENTION

Faucet valves that incorporate sliding ceramic plates have many advantages over other types of faucet valves. The ceramic elements are durable and provide for a long life with virtually no leakage between the two highly polished valving surfaces of the ceramic valve elements. However, in order for the ceramic valves to work in the faucet environment, the valves must be slidable under compressive force. Commonly, this compressive force is obtained by having the lower stationary valve member seated on resilient elastomeric seals. The upper portion of the valve must have all its elements dimensioned precisely so that the movable valve element will be under compressive force. Manufacturing tolerances have to be within a certain range in order for the resilient elastomeric seal to function properly. If the total height of the internal valve members is too great the elastomeric seal becomes overly compressed and the ceramic valve members are pressed against each other with too great a force and are therefore hard to operate.

On the other hand, if the total height of the internal valve members is too little, the resilient elastomeric seal pushes the fixed valve element fully upward but it still does not adequately press the two ceramic valve members together so that leakage between the fixed ceramic plate and the movable top ceramic plate still occurs.

Hydraulic pressure can also be used to press the stationary valve plate up against the ceramic valve disk. Hydraulic pressure is used to press ceramic disks together in a valve disclosed in my U.S. Pat. No. 4,250,912, issued on Feb. 17, 1981, entitled "A Faucet Valve".

What is needed is a mixing valve which can accommodate standard mixing valve cartridges and still use hydraulic pressure to assist in pressing the valve plates together to assist against leakage.

SUMMARY OF THE INVENTION

According to one aspect of the invention, a mixing valve for a faucet includes a faucet body that has a cartridge receiving chamber and a bore situated below the chamber, the bore has fluid inlets at the side wall thereof. A replaceable cartridge is positioned in the chamber of the faucet body. The replaceable cartridge is conventional in nature and has a fixed valve surface, commonly provided by a separate ceramic plate seated on the cartridge body, and a movable valve plate mounted within the cartridge and connected to a control member which can be connectible to a hand operated lever or knob. A hydraulic responsive piston is interposed between the cartridge and the faucet body within the bore. The piston member has fluid passageways with an upstream end alignable with the inlets in the bore and a downstream end alignable with entrances into the cartridge.

Preferably the hydraulic responsive member has a passageway therethrough to allow fluid pressure from one inlet to be in communication with the bottom of the piston to press the piston upwardly against the cartridge and apply compressive force between the fixed plate and the movable plate.

Also, it is preferable to have an independent spring element interposed between the faucet body and the bottom of the piston such that the spring also applies a compressive force between the two valve plates. The spring can be a coil spring or a resilient elastomeric member. An air spring formed in part by captured air between the piston and the body is another alternative.

There are several advantages to having a separate piston member causing a compressive force to the cartridge. Firstly, the combination of hydraulic pressure and spring pressure onto the cartridge provides a total strength which keeps the disks and their seals together and assures sealing adhesion among the parts and at the same time avoids needless extra strength which would increase frictional resistance and stresses of the valve parts.

Furthermore, the piston can be adaptable to connect the inlets with varying standard cartridges by adjusting the location of the downstream end of the piston passages.

Furthermore, sensible proportioning of the parts can allow for sufficient compressive force by the piston without the optional spring.

BRIEF DESCRIPTION OF THE DRAWINGS

Reference now will be made to the following drawings in which:

FIG. 3 is a view similar to FIG. 1 showing a third embodiment of the invention;

FIG. 4 is a view similar to FIG. 1 showing a fourth embodiment of the invention; and FIG. 5 is a cross-sectional plan view passing through the faucet body and piston member shown in FIG. 1.

DETAILED DESCRIPTION OF THE PREFERRED EMBODIMENTS

Figure 1:
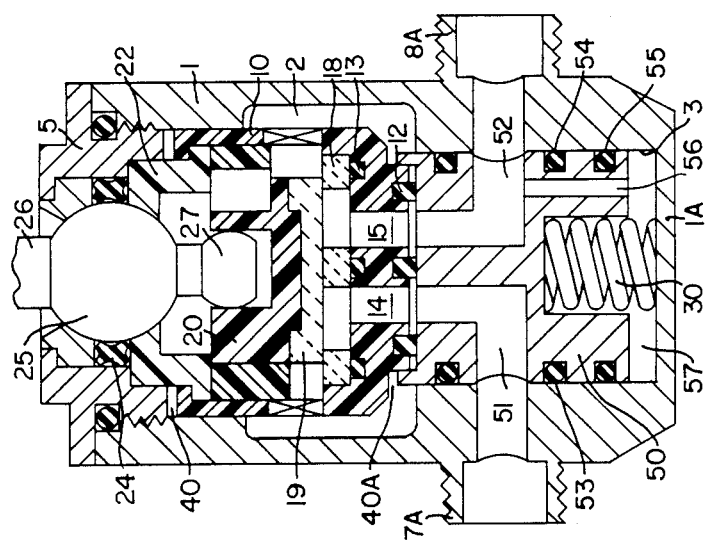
FIG. 1 is a segmented side elevational view of one embodiment of the invention.

Referring now to FIGS. 1 and 5, a faucet body 1 is provided with two inlet connections 7a and 8a for hot and cold water. Furthermore the faucet body as shown in FIG. 5 has a mixed water outlet 40b. The body 1 has a hollow chamber 2 which is adapted to receive a cartridge 10. The chamber 2 is connected to the outlet 40b through a passage 39 shown in FIG. 5.

The cartridge 10 is conventional in nature and includes a fixed disk 18 seated within the cartridge 10 and a movable disk 19 positioned on the fixed disk 18 and movable by a control head 20 which in turn is rotated by ring 21. Both are operated by a lever 27 which is integral with the controlling ball 25 and an operating lever 26. Ball 25 is seated on a bearing surface of a cap member 22 of cartridge 10. The cap member 22 and cartridge 10 can be axially compressed relative to each other. The cap member 22 abuts a cap 5 of the faucet body. Seal 24 circumscribes ball 25 to prevent water from passing out of the chamber in this direction.

A resilient elastomeric seal 13 is interposed between the fixed plate 18 and the cartridge 10. A second resilient elastomeric seal 12 is mounted on the bottom of cartridge 10. It is recognized that the cartridge 10 is conventional in structure and that the operation thereof is also conventional in nature.

A piston member 50 is positioned within the bore 3 for axial movement therein. The piston has two passageways 51 and 52 therein having their upstream ends aligned with the inlet 7a and 8a and downstream ends aligned with two entrances 14 and 15 within the cartridge 10. The seal 12 prevents leakage about the connection of the piston 50 and cartridge 10. Ring seal 54 is mounted about the passageway 52 and ring seal 53 is mounted about the passageway 51. A ring seal 55 is horizontally positioned near the bottom end of the piston 50.

A passage 56 connects the passageway 52 to a chamber 57 formed between the piston 50 and the bottom 1a of the body 1. A coil spring 30 is also mounted between the piston and the bottom 1a and is compressed therebetween.

The assembly of the mixing valve has the spring 30 and the piston 50 dropped into the bore 3. The cartridge 10 is then placed within the chamber 2 along with all the controlling, driving and sealing members. A cap 5 is then screwed into position forcing the piston down into the bore and compressing the spring 30. The spring strength is at a range so that it is great enough to cause the piston to bias the cartridge upwardly so that the fixed plate 18 has a compressive force against the movable plate 19 and prevents leakage therebetween at low water pressure. When water pressure is present within the inlet 8a, water pressure is transmitted through the passage 56 to chamber 57. This water pressure exerts an upward bias on piston 50 to also bias the cartridge 10 upwardly and provide a compressive force between the fixed plate 18 and movable plate 19. Gap 40 between the cap 5 and the cartridge 10 allows for upward movement to a limited degree of the cartridge. Similarly gap 40a between the piston and the cartridge also allows relative limited movement therebetween. As such, if excessive water pressure is present within inlet 8a, the pressure transferred onto seal 12 is limited.

As shown in FIG. 5, the passages 51 and 52 can be angled a desired amount and positioned to accommodate different locations of inlet 7a and 8a and different locations of entrances 14 and 15.

In other words, with the proper construction of piston 50, mixing and matching of different faucet bodies to different standard cartridges is possible.

FIG. 4 shows an embodiment where the piston 50c is stepped at two different diameters. The bore 3c is also complementarily stepped. Seals 60, 61 and 62 are coaxially mounted about the piston and passageways 51 and 52 have their inlets at different heights along with the inlet 7a and 8a.

An annular chamber 57a is in fluid communication with inlet 8a and receives the hydraulic pressure to exert an upward force on the piston 50c. Furthermore, the closed chamber 59 has some entrapped air therein which is compressed as the piston 50c is installed within the bore. This compressed air acts as an air spring to further give an upward bias onto piston 50c.

Figure 2:
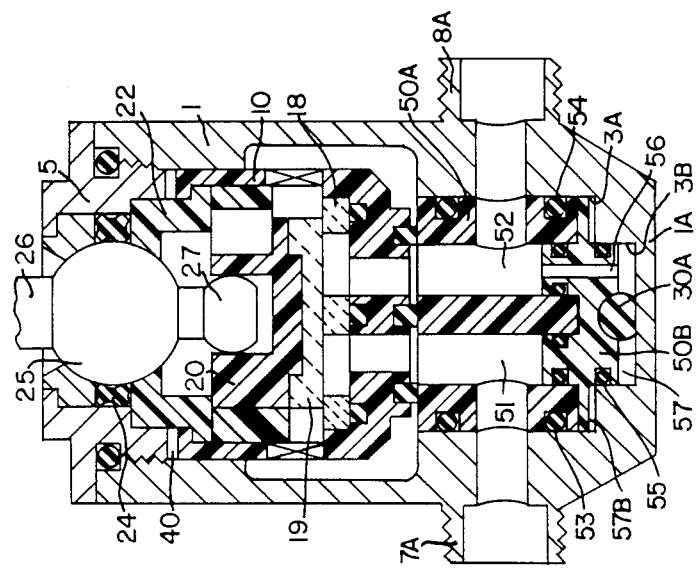
FIG. 2 is a view similar to FIG. 1 showing a second embodiment of the invention.

Referring now to FIG. 2, the two-piece piston includes an upper part 50a and a lower part 50b. The upper part 50a fits within an upper bore section 3a and the lower part fits within the lower bore section 3b. Passage 56 passes through lower section 50b into chamber 57. An elastomeric spring 30a is mounted within the chamber 57 to assist in the upward bias of the piston along with the hydraulic pressure within chamber 57. Thirdly, an annular chamber 57b has entrapped air therein which also has an annular air spring to push up against the piston members 50b and 50a with its compressed air therein. A stepped piston allows for hydraulic pressure on a predetermined area which is independent of the outer diameter of the piston which can be variable to accommodate different sized cartridges 10. Furthermore, the two different pieces 50a and 50b allow for a subdivision of the piston to make it easier to produce and allow unification of parts among devices with different arrangements. The piston parts 50a and 50b can be made integral to still maintain the predetermined fixed hydraulic responsive area at the bottom of the piston.

FIG. 3 shows another variation which has the bottom portion 50b being fully made from elastomeric material and has the integral spring section and forms the seal for the chamber 57. Again, there is a passage 56 that communicates chamber 57 with the inlet 8a.

Pistons, in all embodiments, must be prevented from rotating in the body 1. This anti-rotation can be achieved by introduction of a dowel or other well-known engineering technique.

If the pressure responsive area of the piston is adequately larger than the pressure exerted on the bottom of the fixed disk 18 or on the bottom of the disk 19, hydraulic pressure alone may be adequate to have sufficient upward bias by the piston and have sufficient compressive force between the fixed disk 18 and movable disk 19 without the use of a separate mechanical, elastomeric, or air spring.

Variations and modifications of the present invention are possible without departing from the scope and spirit as defined in the appended claims.

The embodiments of the invention in which an exclusive property or privilege is claimed are defined as follows:

1. A mixing valve for a faucet characterized by:
   a faucet body having a cartridge receiving chamber, a bore below said chamber, and fluid inlets;
   a replaceable cartridge in the chamber of the faucet body;
   a fixed plate of hard material mounted in the cartridge;
   a movable plate housed in the cartridge;
   means operably connected to the movable plate for moving said plate relative to the fixed plate so as to regulate the water flow and the mixing proportions;
   a hydraulic responsive member in the bore of the faucet body and operably interposed between the cartridge and the faucet body, the member having fluid passages which are fluidly connected with the inlets of said body, said passages in fluid communication with respective entrances in said cartridge in said chamber with said entrances selectively opened or closed by said movable disk in said cartridge;
   the hydraulic responsive member having a surface exposed to the pressure through one inlet to press the hydraulic responsive member against the cartridge and apply a compressive force between the two plates.

2. A mixing valve according to claim 1 characterized by:
   spring means interposed between the faucet body and the hydraulic responsive member for pushing the hydraulic responsive member toward the chamber that contains the cartridge.

3. A mixing valve according to claim 2 further characterized by:
the spring means including a coil spring.

4. A mixing valve according to claim 2 further characterized by:
the spring means including a resilient elastomeric material.

5. A mixing valve according to claim 2 further characterized by:
said spring means including an air pressure inner chamber formed between the bottom of the faucet body and the hydraulic responsive member with compressed air contained in the chamber.

6. A mixing valve according to claim 5 further characterized by:
the hydraulic responsive member and the bore in the faucet body having two portions with differing diameters;
the air pressure chamber is annular and is located adjacent the area where the member and bore change diameter.

7. A mixing valve according to claim 1 further characterized by:
the hydraulic responsive member and the corresponding bore of the faucet body having a constant diameter for their entire length.

8. A mixing valve according to claim 1 further characterized by:
the hydraulic responsive member and the corresponding bore of the faucet body having two portions with different diameters.

9. A mixing valve according to claim 8 further characterized by:
an annular pressure chamber formed between the hydraulic responsive member, the faucet body in the area where the member and bore change diameter, said pressure chamber communicates with one inlet.

10. A mixing valve according to claim 1 further characterized by:
a pressure chamber formed between the bottom of the faucet body and the hydraulic responsive member; the chamber being in fluid communication with one inlet through a passage in the hydraulic responsive member.

11. A mixing valve according to claim 1 further characterized by:
said passages shaped to accommodate both the inlets in the faucet body and the cartridge entrances.

12. A mixing valve according to claim 1 further characterized by:
the hydraulic responsive member including two parts, one part having the passages and housing seals at the inlets of the body, a second part being mounted with said seals toward the body bore and the one part, and the second part having a passage therethrough.

13. A mixing valve according to claim 12 further characterized by:
the second part including a body of elastomeric material.

14. A mixing valve according to claim 1 further characterized by:
the passages of the hydraulic responsive member being open on its surface at different axial levels and being fluidly separated by a seal about the perimeter of said hydraulic responsive member.

15. A mixing valve for a faucet characterized by:
a faucet body having a cartridge receiving chamber and a coaxial bore below said chamber and two fluid inlets at the side of said bore;
a replaceable cartridge positioned in said chamber of said faucet body, said cartridge including:
a cap member and cartridge body axially movable with respect to each other;
a fixed valve plate seated within and against said cartridge body;
said cartridge body having entrance ports at a bottom thereof extending through said fixed valve plate;
said cap member abutable against a cap of said faucet body;
a control head abutting said cap member operably connected to control means for controlling movement thereof; and
a movable valve plate fixed to said control head for selectively opening and closing the entrance ports;
a separate piston member fitted within the coaxial bore and sealing abuttable against the bottom of said cartridge;
said piston member having passages therethrough having an upstream end in fluid communication with a respective inlet of said faucet body and a downstream end in fluid communication with a respective entrance of said cartridge;
said piston having a section thereof in fluid communication with one inlet to receive upward biasing hydraulic pressure to bias said piston against the bottom of said cartridge and push said cartridge body to said cartridge cap thereby exerting compressive force between the fixed valve plate and movable valve plate.

16. A mixing valve as defined in claim 15 further characterized by:
a spring positioned in said bore and interposed between said piston and said faucet body to upwardly bias said piston independently of fluid pressure.

17. A mixing valve for a faucet characterized by:
a faucet body having a cartridge receiving chamber and a coaxial bore below said chamber and two fluid inlets at the side of said bore;
a replaceable cartridge positioned in said chamber of said faucet body, said cartridge including:
a cap member and cartridge body axially movable with respect to each other;
a fixed valve plate seated within and against said cartridge body;
said cartridge body having entrance ports at a bottom thereof extending through said fixed valve plate;
said cap member abutable against a cap of said faucet body;
a control head abutting said cap member operably connected to control means for controlling movement thereof; and
a movable valve plate fixed to said control head for selectively opening and closing the entrance ports;
a separate piston member fitted within the coaxial bore and sealing abuttable against the bottom of said cartridge;
said piston member having passages therethrough with each passage having an upstream end in fluid communication with a respective inlet of said faucet body and a downstream end in fluid communication with a respective entrance of said cartridge; and means for biasing said piston toward the bottom of said cartridge and pushing said cartridge body to said cartridge cap thereby exerting compressive force between the fixed valve plate and movable valve plate.

* * * * *